Sept. 16, 1947.  W. E. SWENSON ET AL  2,427,426
CIRCUIT CONTROLLER
Filed Oct. 13, 1944  2 Sheets-Sheet 1
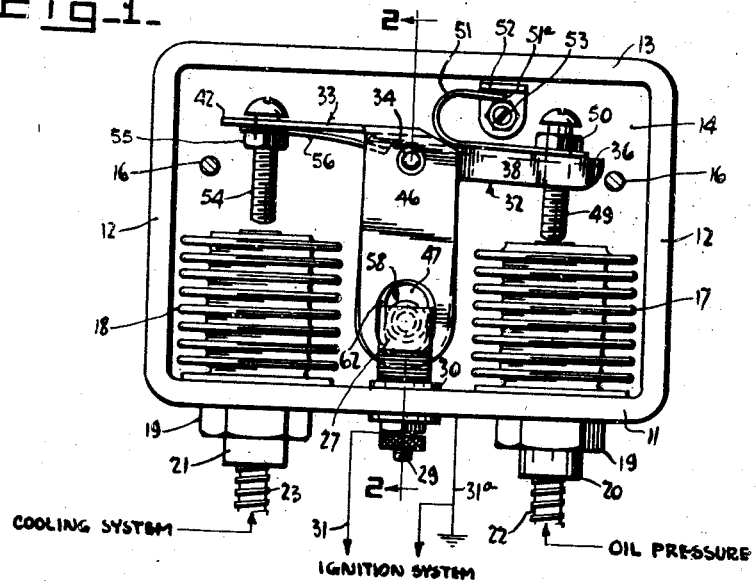
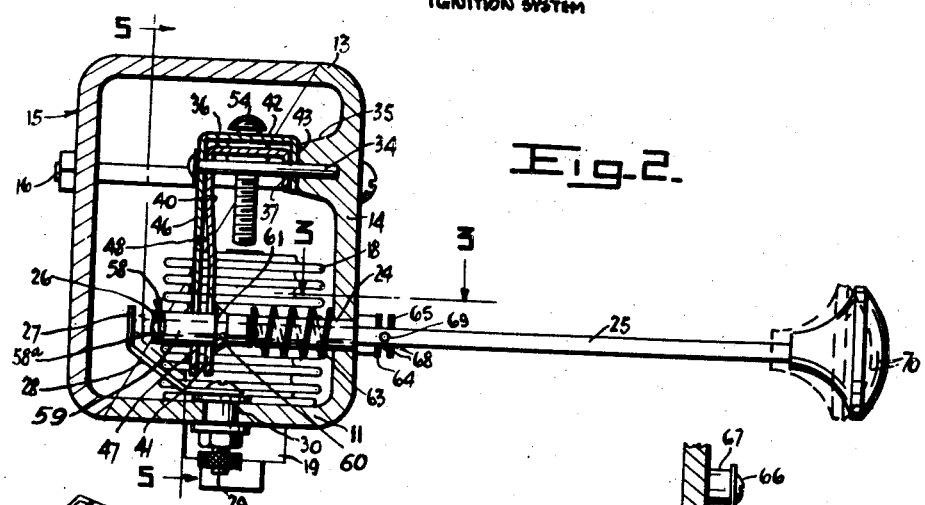
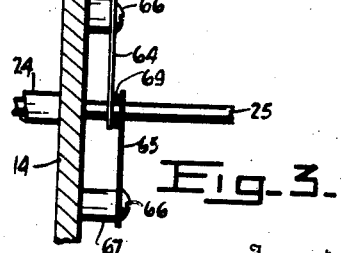
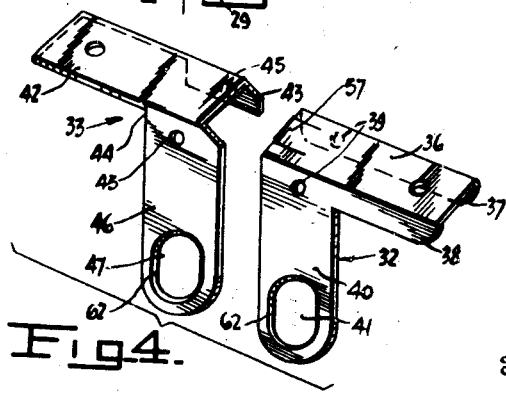
Inventors
WILLIAM E. SWENSON
VICTOR N. ALBERTSON
By Carlsen + Hazle
Attorneys

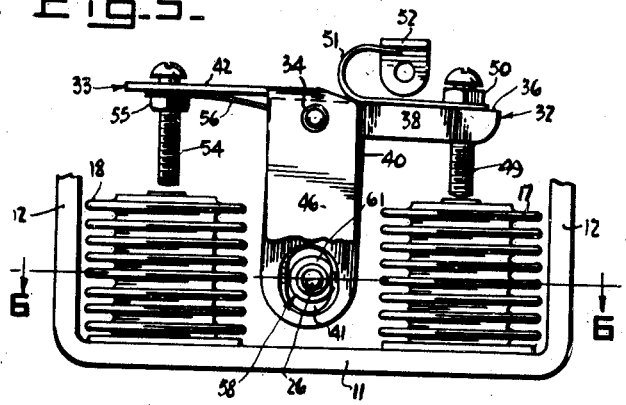
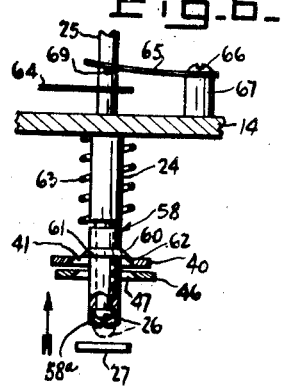
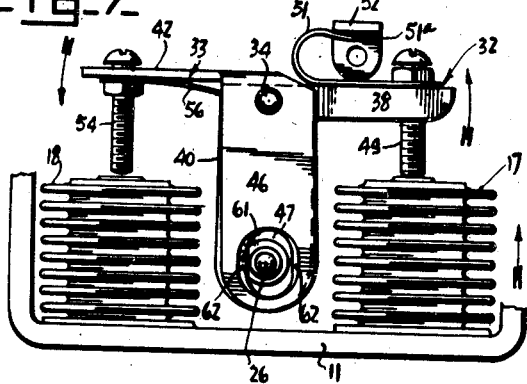
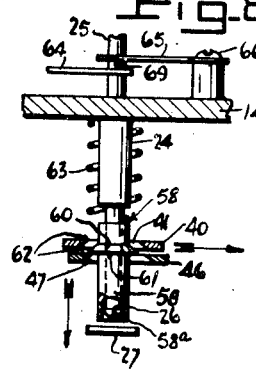
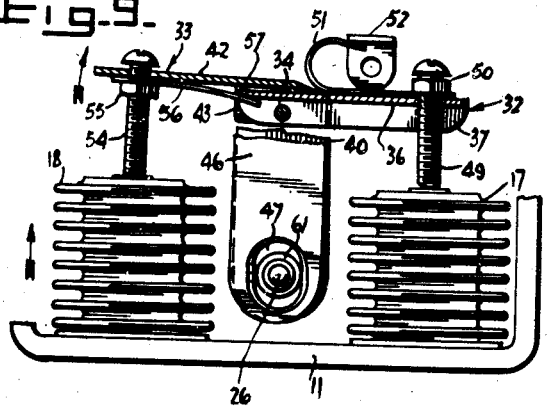
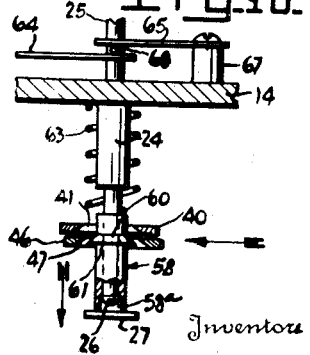

Patented Sept. 16, 1947

2,427,426

UNITED STATES PATENT OFFICE 2,427,426

CIRCUIT CONTROLLER

William E. Swenson, St. Paul, and Victor N. Albertson, Minneapolis, Minn., assignors to Minneapolis-Moline Power Implement Company, Minneapolis, Minn., a corporation of Delaware Application October 13, 1944, Serial No. 558,598

29 Claims. (Cl. 200—81.5)

This invention relates generally to improvements in circuit controllers and more particularly to a circuit controlling switch which is automatically responsive to two separate, variable conditions and which is also manually operative independently of said conditions.

A switch of this nature is particularly applicable to the control of such internal combustion engines as those used in tractors and industrial power plants wherein the switch itself is connected across the magneto or other part of the ignition system in such manner that, when actuated, it will control the ignition of the engine. It is the primary object of our invention to provide a switch of this nature which is automatically actuated in accordance with the lubricating system oil pressure of the engine and the temperature of the liquid in the cooling system so that the engine will be stopped if the oil pressure falls below a predetermined safe minimum, or the operating temperature of the engine exceeds a predetermined safe maximum. Another object is to provide a controller which in addition to being responsive to the conditions above outlined may be manually operated at any time that it is desired to stop the engine. A further object is to provide a controller having an operating member which must be actuated manually to start the engine but which, after being released as the engine starts, is then automatically placed under control of the oil pressure and cooling system temperature of the engine without any further manipulation on the part of the operator. In this manner I overcome the normal human tendency of the operator to neglect to place the ordinary controller for this purpose in condition for automatically stopping the engine when required by falling oil pressures or excessive temperatures. Still a further object of the invention is to provide a controller for this purpose which is exceedingly simple and compact in construction and positive in its operation.

These and other more detailed and specific objects will be disclosed in the course of the following specification, reference being had to the accompanying drawing, in which—

Fig. 1 is an elevation of the controller with the cover of the case thereof removed, with the parts indicated in their normal positions when the engine is not in operation, and with the various connections to the engine indicated diagrammatically.

Fig. 2 is a sectional view along the line 2—2 in Fig. 1, but in this case illustrating the positions assumed by the parts when the control member is actuated for starting the engine, and also indicating the manual operation of the controller member to stop the engine.

Fig. 3 is a fragmentary sectional view substantially along the line 3—3 in Fig. 2, illustrating the positioning or centering springs for the control member.

Fig. 4 is a composite perspective view of the two condition actuated lever or trigger members.

Fig. 5 is a sectional view taken substantially along the line 5—5 in Fig. 2, but with some parts omitted, and indicating the positions assumed by the parts when the control member is actuated for starting the engine.

Fig. 6 is a fragmentary sectional view along the line 6—6 in Fig. 5, but illustrating only the central portion of the apparatus.

Fig. 7 is a view similar to Fig. 5 but illustrating the operation of the controller as the oil pressure of the engine comes up to its normal operating value.

Fig. 8 is a view similar to Fig. 6, but showing the positions assumed by the same parts under the conditions as shown in Fig. 7.

Fig. 9 is a view substantially similar to Figs. 5 and 7, but illustrating the operation of the controller in response to a rise in the operating temperature in the engine beyond the control point, and here also showing parts of the operating levers in section and broken away.

Fig. 10 is a view similar to Figs. 6 and 8 but showing the action of the parts under the conditions referred to in Fig. 9.

Referring now more particularly to the drawing, we have illustrated our controller as arranged within a case or housing having a base or bottom wall 11, side walls 12, a top 13 and a forward wall 14, forming a rectangular box-like enclosure adapted to be closed at the rear by a complementary cover, which is indicated generally at 15, and which is secured to the case by bolts 16. Supported in spaced relation within the case is a pressure responsive bellows or "Sylphon" 17 and a temperature sensing bellows or Sylphon 18. These bellows are arranged upon the bottom 11 of the case and are secured rigidly thereto by means of nuts 19 through which extend couplings 20 and 21, respectively communicating interiorly with the bellows 17 and 18. A connection is made between the pressure responsive bellows 17 and the lubricating system of the engine (not shown) by any suitable means, such as the flexible tube indicated at 22, so that the lubricating oil under pressure will be conducted to the interior of the bellows. A capillary tube is enclosed in a flexible casing 23 and is connected between the coupling 21 of the pressure sensing bellows 18 and a bulb (not shown) which is exposed to the fluid circulating in the cooling system of the engine. This tube and bulb arrangement is conventional in the art and operates in such manner that the bellows 18 expands as the temperature of the cooling system increases, and vice versa.

In the front wall 14 of the case there is secured a tubular guide bushing 24 which extends rearwardly between the bellows 17 and 18 and through which is slidably mounted an operating member or control rod 25. Through the bushing 24 the control rod 25 may be moved back and forth in a plane at right angles to the axes of the bellows and the rear extremity of the control rod is upset or headed forming a contact button 26 adapted in response to such movements of the rod to move toward and away from a fixed contact 27. Said contact 27 is formed by the upturned end of a metallic strip 28 which is anchored by a screw 29 to the bottom 11 of the case. The screw 29 is insulated from the case by a bushing 30 in a conventional manner and forms a convenient means by which the connection may be made between the contact 27 and the ungrounded side of the ignition system of the magneto (not shown). A conductor for this purpose is illustrated at 31 in Fig. 1, while another conductor 31ᵃ is indicated as connected to the case itself and to the grounded side of the ignition system. Obviously when mounted upon the engine or tractor this grounded connection will be made without use of a separate conductor and the movement of the control rod 25 rearwardly to bring the contact button 26 into electrical connection with the contact 27 will result in the grounding of the magneto or shorting out thereof, whereas pulling the rod forwardly will open this circuit. The exact electrical connections are immaterial to the present invention and it will be understood that when properly made the engagement of the contact button 26 and contact 27 will prevent operation of the engine while the severance of this connection will permit the engine to be started.

The control rod 25 and fixed contact 27 are thus seen to comprise the manual circuit controlling switch portion of the device and in addition to the manual manipulation thereof as described, the contact or circuit is also adjusted in response to the expansion and contraction of the bellows 17 and 18, as will now be described.

Arranged in the case between the two bellows, and for swinging movements in planes at right angles to the axes of the control rod 25, are a setting lever or member, designated generally at 32, and a trip member, indicated generally at 33. These parts operate in a sense as double or first and second triggers for controlling the operation of the switch, and they are mounted for pivotal movement upon a supporting pin 34 secured in a boss 35 on the front wall 14 of the case and extending horizontally and rearwardly therefrom. The first trigger or setting member 32 is generally L-shaped in form and is pressed from sheet metal to provide an upper channeled arm 36 having front and rear depending flanges 37 and 38 which are apertured at 39 for engaging the pin 34. Adjacent the pivoted end of the arm 36 the rear flange 38 extends downwardly in the form of a lower trigger arm 40 which has a large opening 41 embracing but substantially clearing the operating rod 25. The second trigger member 33 is similarly L-shaped and pressed from sheet metal forming a flat upper arm 42 adapted to overlie the upper arm 36 of the first member 32, and having front and rear flanges 43 and 44 apertured at 45 to fit the pin 34. These flanges 43 and 44 are arranged astraddle the corresponding flanges 37 and 38 of the first member 32, and the rear flange 44 is extended in a downward direction to form a lower trigger arm 46 which is disposed rearwardly of the arm 40 and similarly is provided with a large opening 47 to embrace and clear the operating rod 25. Lower ends of the respective arms 40 and 46 are spaced apart in the direction of the axes of the operating rod 25 by slightly offsetting the arm 40, as indicated at 48 in Fig. 2.

The free end of the upper arm 36 of first trigger member 32 carries an adjustable screw or operating member 49 which depends therefrom over the pressure responsive bellows 17 and which may be adjusted in a vertical direction with respect to the bellows and locked by a nut 50. Also anchored by the nut 50 is one end of a bow spring 51 which extends back along the arm 36 toward the pivot pin 34 and is then turned upwardly and outwardly providing an end 51ᵃ which is braced against a bracket 52 secured, as indicated at 53, to the front wall 14 of the case. The effect of the spring 51 is to normally swing the upper arm 36 of the first trigger member 32 in a downward direction and this movement is limited, by means later to be described, to the point that in the normal condition of the bellows 17 the screw 49 may be properly adjusted to just clear the upper end of the same, as indicated in Fig. 1. The free end of the upper arm 42 of the second trigger member 33 also carries a screw or operating member 54 which depends therefrom over the upper end of the temperature sensing bellows 18 and this screw is likewise locked in any adjusted position with respect to the bellows by means of a lock nut 55. Likewise the lock nut 55 also anchors one end of a spring 56 which is of flat strip material and extends inwardly to underlie the adjacent pivoted end of the upper arm 36 of the first trigger member 32. The spring 56 is tensioned to bear upwardly upon this end of the arm 36 and the fitting is such that the arm 42 overlying the inner end of the arm 36 causes both the trigger members 32 and 33 to swing as a unit about the pin 34. However, it will be evident in Figs. 1 and 9 that the second trigger member 33 may also swing through a limited arc or range independently of the first trigger member 32 and in a clockwise direction from the positions therein indicated. The inner extremity of the upper arm 36 has a web or ear portion 57 which is turned upward slightly and contacts the underside of the arm 42 under influence of the spring 56 to cause the operation of the trigger members in unison, in response to a clockwise direction of movement of the first trigger member, as will be clearly evident. The swinging movement of the second trigger member 33 is also limited by means which will later appear, and the screw 54 may be adjusted so that in the normal position of the parts it is lower and will substantially clear the upper end of the bellows 18 when the same is in a normal position, indicating that the temperature of the engine is below the danger point.

Slidably mounted upon the operating rod 25 rearwardly of the bushing 24 is a metallic spring actuated contact member, designed generally at 58, which takes the form of a tubular collar 59 slidably fitted upon the rod and passing loosely through the aforesaid openings 41 and 47 in the lower arms 40 and 46 respectively. Intermediate its ends the collar 59 has a diametrically enlarged flange which is tapered off on its forward surface, as indicated at 60, and on its rear surface forms an annular, radially projecting catch or sear surface 61. The diameter of this surface 61 is such that it will just nicely pass through the openings 41 and 47 or rather between the sides thereof since they are, as best shown in Fig. 4, elongated or oval in the vertical direction for convenience in fitting the parts. It will also be noted that these upright sides of the openings 41 and 47 are beveled off on their rear edges, as indicated at 62, so that in effect knife edges are formed for engaging the catch surface 61 as will presently appear.

The contact member 58 is normally urged rearwardly with respect to the control rod 25 by an actuating spring 63 which is coiled over the bushing 24 and at its forward end is braced against the forward wall 14 of the case. The rear coil of the spring 63 is reduced in diameter to such point that it may be braced against the forward end of the contact member, as shown in Fig. 2, to exert a yieldable rearward force thereupon. The operating rod 25 is controlled by positioning or centering springs 64 and 65 which as here shown are anchored at outer ends by screws 66 upon studs 67 on the forward side of the case. From these studs the springs 64 and 65, which are of the flat leaf variety, extend toward each other in normally spaced and overlapping relation at their ends and are apertured, as indicated at 68, to receive and clear the rod 25. A pin 69 is anchored diametrically through the rod between the free ends of the springs 64 and 65 and it will be evident that the springs 64, as thus arranged, will yieldably resist rearward movement of the rod while the spring 65 will similarly oppose forward movement thereof. The effect is to normally center the rod in a certain position and to normally hold the rod in such position that the button 26 on its rear end will clear the contact 29. In this connection it will be noted that the button 26 will limit rearward movement of the contact member 58 and the rear end of this member 58 is recessed at 58ª to receive the button under pressure of the spring 63, in which position the rear end of the sleeve 59 will stand in engagement with contact 27 (Fig. 10).

*Operation*

In the normal position of the parts, with the engine at rest and no oil pressure present in the bellows 17, and of course with the bellows 18 relatively collapsed, the contact member 58 will bear rearwardly upon the fixed contact 27 causing the magneto or ignition system to be grounded or shorted out. Assuming then that the engine is to be started the control rod 25 will be pulled in the forward direction, by means of the knob 70 on its forward end, so that the button 26 draws the contact member 58 forwardly clear of contact 27 and the ignition system becomes effective to operate the engine. In this operation of pulling contact member 58 forward the tapering forward surface 60 thereon cams its way through the openings 41 and 47 in the arms 40 and 46. As the flange having the said surface 60 moves forwardly of the innermost arm 40 the tension of the bow spring 51 will then swing the arm 40 in a clockwise direction until its right hand edge contacts the adjacent surface of the collar 59 rearwardly of the catch surface 61 so that rearward or return movement of the contact member will thus be prevented. This is the condition of the parts as illustrated in Figs. 5 and 6 particularly. Immediately, however, as the engine begins its operation the oil pressure will normally build up causing an expansion of the pressure sensing bellows 17. The upper end of the bellows 17 then will engage the lower end of the screw 40 and will urge the outer end of the upper arm 36 upwardly in such manner as to cause a counterclockwise movement of the first trigger member 32, as viewed in the drawing. The result of this movement is to cause the trigger arm 40 to move to the right to such point that the right hand edge of the opening 41 therein will clear the catch surface 61 of the contact member 58, allowing the actuating spring 63 to urge the same in a rearward direction. As the contact member 58 thus moves rearwardly the catch surface 61 thereof is caught upon the left hand edge of the opening 47 in the trigger arm 46 of second trigger member 43, attention being directed in this connection to the fact that said lower arm 46 normally stands slightly to the right of an alignment with the arm 40 under influence of the spring 56, so that the left hand edge of the spring 47 bears upon the side of the collar 59 in a position in the path of the said catch surface 61. This is the condition of the parts illustrated in Figs. 7 and 9.

As illustrated in Fig. 6, the forward pull upon the rod 25, after drawing the contact member 58 forwardly, will be normally released by the operator as his engine starts, and following such release the spring 65 will urge the control rod rearwardly again until it assumes the normal central position to which it is actuated by co-operation of the springs 64 and 65. The contact member 58 being now, however, prevented from rearward movement both the button 26 and rear end of member 58 will come to rest in spaced relation to fixed contact 27, as indicated in Fig. 6. The spacing between the arms 40 and 46 adjusted by the offsetting of the former, as heretofore indicated at 48, is then such that the first stage movement of the contact member 58, responsive to the building up of the oil pressure to the normal operating level, will result in the contact member coming to rest clear of the contact 27, as it is shown in Fig. 8. Here, however, the contact member is locked against further rearward movement by the trigger arm 46 so that the actuating spring 63 cannot cause the switch to close.

Figs. 9 and 10 illustrate the result of a temperature rise in the engine beyond a safe maximum and it will be apparent that the resulting expansion of the bellows 18, as indicated by the arrow, will cause the upper end thereof to engage the screw 54 and urge the arm 42 in an upward direction. The result of this movement is a movement of the trigger arm 46 to the left or clockwise, as viewed in the drawing, so that the left hand edge of the opening 47 now clears the catch surface 51 on the contact member 58. Immediately then the contact member is freed so that the pressure of the spring 63 will snap it rearwardly the short distance necessary to bring its rear end into engagement with the contact 27 and immediately stop the engine. The same action results from a decrease in the oil pressure in the bellows 17 after it has once built up to the operating level, as indicated in Figs. 7 and 8. Such a decrease in oil pressure will, as apparent, permit the bellows 17 to collapse and the resulting downward movement of the arm 36 under influence of the spring 51 will cause the first trigger member 32 to operate as a unit with the second trigger member 33, swinging the latter in a clockwise direction to clear the left hand edge of the opening 47 from the catch surface 61 so that the contact member 58 may again snap the contacts together. This co-action of the first and second trigger members responsive to the collapse of the bellows 17, of course, is brought about by the contact of the ear 57 and the underside of the arm 42 of the second trigger.

Attention is called to the fact that during automatic operation of the switch only the slidable contact member 58 is controlled by the bellows 17 and 18. Thus the bellows are relieved of the load of the operating rod 25 and its centering spring 64 and 65 so that the action is very sensitive. A light spring at 63 may also be used for this reason.

It will be apparent from the foregoing that the switch or control when once actuated manually as required to start the engine, and held until the engine starts, will then be automatically placed under control of both the oil pressure and the engine temperature without any further thought upon the part of the operator. Also it will be evident that at any time and in any set position of contact member 58 the operating rod 25 may be urged rearwardly by hand, as indicated by the dotted lines in Fig. 2, to stop the engine regardless of the conditions automatically controlling the switch. The later manual action is permissible by virtue of the slidable relation between the operating rod and the automatic contact member 58 and obviously the centering or positioning springs for the operating rod will return the same to normal position when released.

It is understood that suitable modifications may be made in the construction and details of the machine as thus described, without departing from the spirit and scope of the appended claims. Having now therefore fully disclosed our invention what we claim to be new and desire to protect by Letters Patent is:

1. In a circuit controller, a first trigger member, condition responsive means controlling said trigger member, a second trigger member, a second condition responsive means controlling said second trigger member, and a movable contact member yieldably associated with said trigger members and operatively arranged to be released thereby from one position by the first trigger member and from a second position by the first and second trigger members, when said trigger members are actuated by their respective condition responsive means.

2. In a circuit controller of the character described, a contact member movable to at least three positions, a first lever member operative to hold the contact member in a first position, pressure responsive means for actuating said first lever member to release the contact member and permit it to move to a second position, a second lever member operative to hold the contact member in said second position, a temperature responsive means controlling said second lever member and adapted to release and permit the contact member to move to a third position, and said contact closer in its third position being operative to control said circuit.

3. In a circuit controller, a contact member movable to at least three positions, spring means operative to urge said contact member from a first through a second and to a third position sequentially, a first lever member operative to hold the contact member in a first position, pressure responsive means for actuating said first lever member to release the contact member and permit it to move to a second position, a second lever member operative to hold the contact member in said second position, and a temperature responsive means controlling said second lever member and adapted to release and permit the contact member to move to a third position, said contact member in its third position being operative to control said circuit.

4. In a circuit controller, a contact member movable to three positions, a first lever member operative to hold the contact member in a first position, pressure responsive means for actuating said first lever member to release the contact member and permit it to move to a second position, a second lever member operative to releasably hold the contact member in said second position, a temperature responsive means controlling said second lever member and adapted to release and permit the contact member to move to a third position, means connecting the said lever members whereby said pressure responsive means will also operate the second lever member to release the contact member, and said contact member in its third position being operative to close the controlled circuit.

5. In a circuit controller, a movable contact member, a first lever member operative to hold the contact member in a first position, pressure responsive means for actuating said first lever member in response to a pressure rise to release the contact member from its first position, a second lever member for holding the contact member in a second position, temperature responsive means for actuating said second lever member to release the contact member upon a rise in temperature, and means operative by said contact member in its third position for closing the controlled circuit.

6. In a circuit controller, a contact member movable to at least three positions, a first lever member operative to hold the contact member in a first position, pressure responsive means for actuating said first lever member in response to a pressure rise to release the contact member from its first position, a second lever member for holding the contact member in a second position, temperature responsive means for actuating said second lever member to release the contact member upon a rise in temperature, means connecting the lever members for also operating the second in response to a decrease in pressure to release said contact member from its second position, and means engaged by the contact member in its third position for closing the controlled circuit.

7. In a circuit controller, a movable contact member, means for positioning the member in a first position, pressure responsive means for releasing said contact member upon a rise in pressure, means for holding the contact member in a second position, temperature responsive means responsive to an increase in temperature for releasing said contact member from said second position, contact means for engagement by the contact member in a third position for controlling the circuit, and means operative by a decrease in the pressure effective in said pressure responsive means for also releasing the contact member from its second position.

8. In a circuit controller, a movable contact member, means for positioning the member in a first position, pressure responsive means for releasing said contact member from said first position upon a rise in pressure, means for holding the contact member in a second position, contact means adapted to be engaged by the contact member in a third position for controlling the circuit, and said first positioning means being manually operative for engaging said contact means independently of the position of said contact member.

9. In a control device of the character described, a first lever member, pressure responsive means for moving said lever in a first direction, a second lever member, temperature responsive means for moving said second lever member in one direction, cooperating means on the lever members for moving the second in said one direction also in response to a pressure change opposite to that moving the first member in said first direction, and circuit controlling means operative by the lever members.

10. In a control device of the character described, a first lever member, pressure responsive means for moving said lever in a first direction, a second lever member, temperature responsive means for moving said second lever member in one direction, cooperating means on the lever members for moving the second in said one direction also in response to a pressure change opposite to that moving the first member in said first direction, and circuit controlling means adapted to be held in a set position by said first movement of the first lever member and to be released and operated to a circuit closing condition upon said movement of the second lever member.

11. In a circuit controller, a manually positionable operating member, a fixed contact, a member movable on said operating member, spring means operative to urge said movable member in one direction to a position engaging the fixed contact, and separate pressure and temperature responsive means for holding said movable member in selected adjusted positions and for releasing the same in response to predetermined changes in pressure and temperature to thereby cause said movable member to engage the fixed contact.

12. In a circuit controller of the character described, a fixed contact, a control member movable by hand away from said contact to open the controlled circuit, a member slidable on said control member, a spring for urging the slidable member in one direction toward the contact, and separate condition responsive means for releasably holding said slidable member against the tension of the spring.

13. In a circuit controller, a fixed contact, a control member movable by hand toward and away from said contact and having a contact member for engaging the same to control the circuit, spring means for centering and normally holding the control member in a position spaced from the fixed contact, a member movable on the control member, a spring operative on said movable member to urge it one direction and operative to carry said movable member against the fixed contact, and separate pressure responsive means for releasably holding the movable member in adjusted positions and for releasing the member in response to variations in pressure to cause said movable member to move against said fixed contact.

14. In a circuit controller of the character described, a fixed contact, a control rod movable toward and away from the fixed contact and having a button on its end for engaging said contact to close the controlled circuit, a collar slidable on the control rod, spring means normally urging the collar against the button and into engagement with the fixed contact, the said control rod being movable by hand away from the fixed contact to force the collar against the spring, and separate condition responsive means for releasably holding the collar in manually adjusted positions against the tension of the spring.

15. In a circuit controller of the character described, a movable contact member, a spring normally urging said member in one direction, manually operative means for moving said member to a first adjusted position against the tension of the spring, a pressure sensing bellows, means operated by said bellows for releasably holding the contact member in said first position, a temperature sensing bellows, and a second means operated selectively by the bellows for releasably holding the contact member in a second position.

16. A mechanism for shorting out the ignition supply of an engine responsive selectively to a decrease in oil pressure and rise in engine temperature beyond predetermined control points, comprising a movable contact member, spring means for urging said member in one direction to short out said ignition supply, manual control means for moving said member in an opposite direction against the tension of the spring, a bellows sensing the oil pressure, a first lever member actuated by said bellows for releasably holding said contact member to a first adjusted position and operative to release the member upon a rise in pressure to said control point, a bellows sensing the temperature of the engine, a second lever member adapted to engage said contact member as it is released by the first lever member and responsive selectively by an increase in temperature and decrease of oil pressure for releasing said contact member to short out the ignition supply.

17. A mechanism for shorting out the ignition supply of an engine responsive to a decrease in oil pressure or rise in engine temperature beyond predetermined control points, comprising a movable contact member, spring means for urging said member in one direction to short out said ignition supply, manual control means for moving said member in an opposite direction against the tension of the spring, a bellows sensing the oil pressure, a first lever member actuated by said bellows for releasably holding said contact member to a first adjusted position and operative to release the member upon a rise in pressure to said control point, a bellows sensing the temperature of the engine, a second lever member adapted to engage said contact member as it is released by the first lever member and responsive selectively by an increase in temperature and decrease of oil pressure for releasing said contact member to short out the ignition supply, and said manual control means being manually adjustable in any position of the contact member to short out the ignition supply independently of said member.

18. In a circuit controller of the character described, a contact member movable manually in one direction for opening the circuit and yieldably urged in the opposite direction, said member having a catch surface, a first lever member having an edge portion for engaging said catch surface to hold the contact member against the spring, a second lever member having an edge portion for engaging the catch surface to hold the contact member, said second lever member having said edge portion located in the path of said catch surface to engage and hold the contact member as it is released from the first lever member, and separate condition sensing means operating said lever member.

19. In a circuit controller of the character described, a circuit closing contact member movable manually in one direction for opening the circuit and yieldably urged in the opposite direction, said member having a catch surface, a first lever member having an edge portion for engaging the catch surface to hold the contact member, said second lever member having said edge portion located in the path of said catch surface to engage and hold the contact member as it is released from the first lever member, pressure sensing means for actuating the first lever member, and temperature sensing means for actuating the second lever member.

20. In a circuit controller of the character described, a contact member movable to at least three positions, a first retention member operative to hold the contact member in a first position, pressure responsive means for actuating said first retention member to release the contact member and permit it to move to a second position, a second retention member operative to hold the contact member in said second position, a temperature responsive means controlling said second retention member and adapted to release and permit the contact member to move to a third position, and said contact closer in its third position being operative to control said circuit.

21. In a circuit controller, a contact member movable to three positions, a first retention member operative to hold the contact member in a first position, pressure responsive means for acutating said first retention member to release the contact member and permit it to move to a second position, a second retention member operative to releasably hold the contact member in said second position, a temperature responsive means controlling said second retention member and adapted to release and permit the contact member to move to a third position, means connecting the said retention members whereby said pressure responsive means will also operate the second retention member to release the contact member, and said contact member in its third position being operative to close the controlled circuit.

22. In a circuit controller, a movable contact member, a first retention member operative to hold the contact member in a first position, pressure responsive means for actuating said first retention member in response to a pressure rise to release the contact member from its first position, a second retention member for holding the contact member in a second position, temperature responsive means for actuating said second retention member to release the contact member upon a rise in temperature, and means operative by said contact member in its third position for closing the controlled circuit.

23. In a circuit controller, a movable contact member, means for retaining the member in a first position, condition responsive means for releasing the member from its said first position and permitting it to move into a second position, means for releasably retaining the contact member in its second position, contact means adapted to be engaged by the contact member in a third position for controlling the circuit, and manually operative means for establishing circuit connection between the contact means and contact member irrespective of the position of said contact member.

24. In a circuit controller, a circuit controlling element movable into two inactive positions and one active or circuit controlling position, a pair of retention members for selectively holding the controlling element in its two inactive positions, and condition responsive means for automatically releasing the circuit controlling element from the retention members to permit it to move to its circuit controlling position.

25. In a circuit controller, a circuit controlling element movable into two inactive positions and one active or circuit controlling position, a pair of retention members for selectively holding the controlling element in its two inactive positions, and condition responsive means for successively releasing the circuit controlling element from its two inactive positions whereby it may move to its circuit controlling position.

26. In a circuit controller, a circuit controlling element movable into two inactive positions and one active or circuit controlling position, a pair of retention members for selectively holding the controlling element in its two inactive positions, and condition responsive means for successively releasing the circuit controlling element from its two inactive positions whereby it may move to its circuit controlling position, said condition responsive means including a pair of pressure responsive devices associated with said retention members.

27. In a circuit controller, a circuit controlling element movable into two inactive positions and one active or circuit controlling position, a pair of retention members for selectively holding the controlling element in its two inactive positions, and condition responsive means for successively releasing the circuit controlling element from its two inactive positions whereby it may move to its circuit controlling position, said condition responsive means including a pair of devices, one influenced by pressure and the other by temperature.

28. A mechanism for shorting out the ignition supply of an engine responsive selectively to a decrease in oil pressure and rise in engine temperature beyond predetermined control points, comprising a movable contact member, spring means for urging said member in one direction to short out said ignition supply, manual control means for moving said member in an opposite direction against the tension of the spring, a device responsive to oil pressure, a member adapted to be actuated by said oil pressure responsive device to releasably retain the contact member in one inactive position, a device responsive to engine temperature, and a member adapted to be actuated by said engine temperature responsive device to releasably retain the contact member in a second inactive position.

29. A mechanism for shorting out the ignition supply of an engine responsive selectively to a decrease in oil pressure and rise in engine temperature beyond predetermined control points, comprising a movable contact member, spring means for urging said member in one direction to short out said ignition supply, manual control means for moving said member in an opposite direction against the tension of the spring, a device responsive to oil pressure, a member adapted to be actuated by said oil pressure responsive device to releasably retain the contact member in one inactive position, a device responsive to engine temperature, and a member adapted to be actuated by said engine temperature responsive device to releasably retain the contact member in a second inactive position, said manual control means being constructed and operative to short out the ignition supply when the contact member is in either inactive position.

WILLIAM E. SWENSON.
        VICTOR N. ALBERTSON.

REFERENCES CITED

The following references are of record in the file of this patent:

UNITED STATES PATENTS

| Number | Name | Date |
| --- | --- | --- |
| 2,105,611 | Olson | Jan. 18, 1938 |
| 1,387,746 | Webb | Aug. 16, 1921 |
| 2,162,174 | Jones | June 13, 1939 |
| 1,530,730 | Leeb | Mar. 24, 1925 |
| 1,565,499 | Reid | Dec. 15, 1925 |

FOREIGN PATENTS

| Number | Country | Date |
| --- | --- | --- |
| 16,595 | Great Britain | July 11, 1914 |